United States Patent

[11] 3,581,277

| [72] | Inventors | Robert D. Beatty, Jr.<br>Gates Mills;<br>Thomas C. Griffiths, Chardon, both of, Ohio |
|---|---|---|
| [21] | Appl. No. | 676,891 |
| [22] | Filed | Oct. 20, 1967 |
| [45] | Patented | May 25, 1971 |
| [73] | Assignee | Eaton Yale & Towne Inc.<br>Cleveland, Ohio |

[54] TIRE INFLATION MONITORY SYSTEM
18 Claims, 4 Drawing Figs.

[52] U.S. Cl. .................................................. 340/58, 340/268
[51] Int. Cl. ..................................................... B60c 23/00

[50] Field of Search........................................... 340/52, 53, 58, 268, 27, 263; 180/103

[56] References Cited
UNITED STATES PATENTS

| 3,130,805 | 4/1964 | Carter et al. ................. | 180/103 |
| 3,253,672 | 5/1966 | Mikina ........................ | 340/52 |

Primary Examiner—John W. Caldwell
Assistant Examiner—Howard S. Cohen
Attorney—Yount and Tarolli

ABSTRACT: Angular movements of wheels or other objects rotating at the same surface speed are sensed as by counting revolutions of the wheels or objects with the angular movements of the wheels or objects being compared with each other or a reference to determine whether or not one wheel or object has a smaller diameter.

PATENTED MAY 25 1971

INVENTORS
ROBERT D. BEATTY JR.
THOMAS C. GRIFFITHS
BY
Yount, Flynn and Jarolli
ATTORNEYS

TIRE INFLATION MONITORY SYSTEM

The present invention relates to a method and apparatus for sensing a difference in diameter or rotation of a pair of rotating members such as the wheels of an automobile.

An object of the present invention is to provide a new and improved method and apparatus for monitoring an inflated tire on a vehicle in which angular movement of the wheel is sensed to determine whether the tire is underinflated.

Another object of the present invention is to provide a new and improved method and apparatus for providing a signal when a tire on the wheel of the vehicle is underinflated in which an output which is a function of the angular movement of the wheel is compared with a reference which varies in accordance with vehicle speed.

A further object of the present invention is to provide a new and improved system for indicating an underinflated tire on a wheel of a vehicle in which the angular movement of the wheel is compared with the angular movement of another wheel or wheels and an underinflation signal given when the angular movements of the wheels differ, the system preferably being such that momentary differences in wheel velocity, such as caused by cornering, will not cause an underinflation signal to be falsely given.

A still further object of the present invention is to provide a new and improved apparatus and method for sensing an underinflated tire on any one of a plurality of vehicle wheels in which pulses are generated in response to the rotation of each wheel and counted over a predetermined interval and a signal derived if the number of pulses received from one wheel differs from the pulses received from another wheel by a predetermined amount.

The present invention further contemplates the provision of a new and improved method and apparatus for determining the relative diameter of two rotating objects in which the rotating objects are driven at surface speeds which bear a fixed relationship to one another and the angular movements of the rotating objects compared to obtain an indication of the relative diameters of the objects.

Further objects and advantages of the present invention will be apparent from the following detailed description of the preferred embodiment thereof made with reference to the accompanying drawings forming a part of the present specification for all subject matter disclosed therein and in which.

Figure 1:
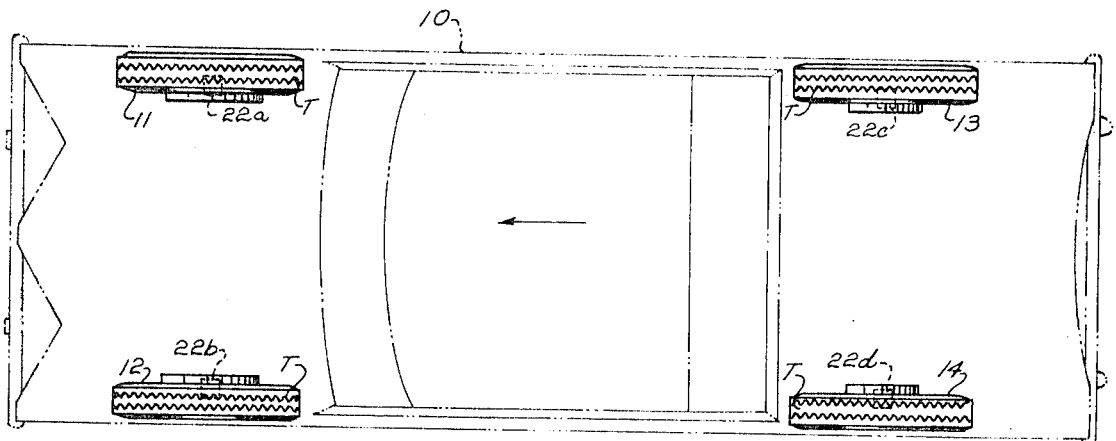
FIG. 1 is a diagrammatic showing of an automobile embodying the present invention.

In the preferred embodiment of the present invention illustrated in the drawings and described in the following specification, the presence of an underinflated tire on an automotive vehicle 10 is sensed by continuously monitoring the rotational velocities of the wheel of the automobile and indicating when one wheel of an automobile is rotating at a significantly different velocity than another wheel. In the illustrated embodiment, the angular movements of the front wheels 11, 12 are compared with each other and the angular movements of the rear wheels 13, 14 of the vehicle are compared with each other and a signal given if the angular movements of the wheels of either pair differ sufficiently to indicate an underinflated tire.

Figure 2:
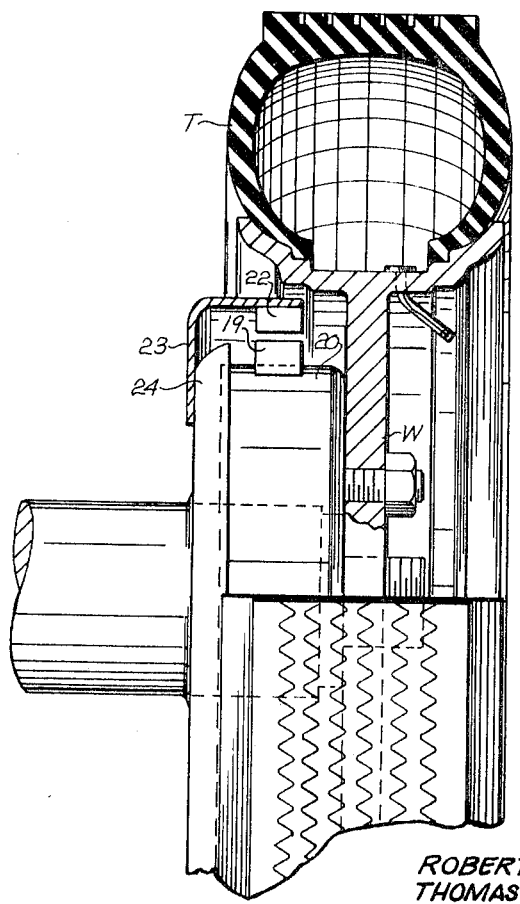
FIG. 2 is a cross-sectional view of a wheel with a revolution sensing device associated therewith.
Figure 3:
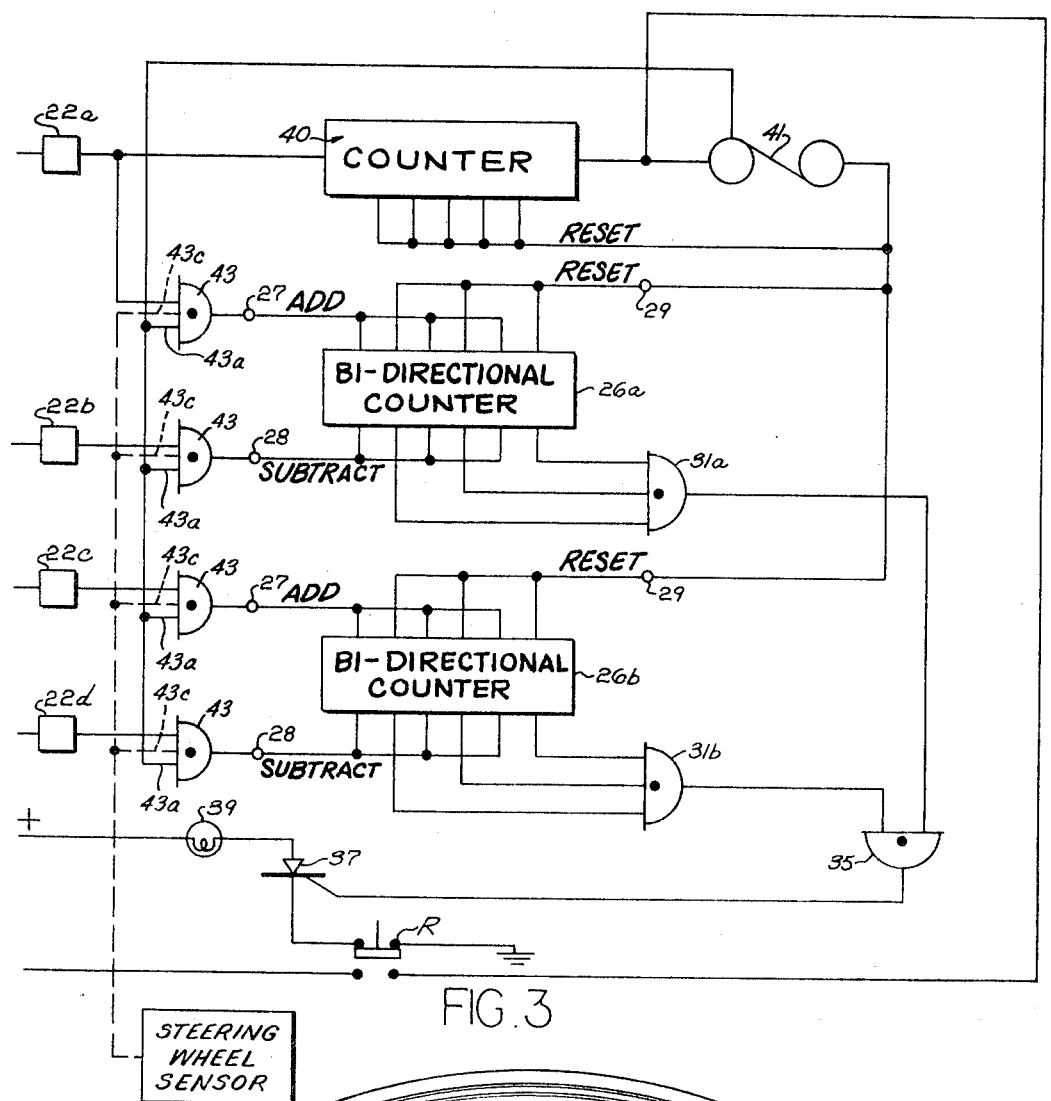
FIG. 3 is a diagrammatic view of the system for sensing an underinflated tire on the vehicle of FIG. 1.

The angular velocity of each wheel is indicated by counting the revolutions of the wheel. For this purpose, a block of metal 19 is mounted on the brake drum 20 of the wheel W, see FIG. 2, and projects radially outwardly thereof to pass in close proximity thereto. The pickup 22 may be a switch which is operated by the attraction of a permanent magnet forming a part of the switch mechanism to the block 19 so that the switch contacts are closed as the block 19 passes the switch to momentarily make an electrical circuit. The electromagnetic pickup 22 for each wheel may be mounted on a bracket 23 attached to the frame member 24 for supporting the brake shoes which operate on the brake drum 20. The pickups for the front wheels 11, 12 are designated 22a, 22b, respectively, while the pickups for the rear wheels 13, 14 are designated 22c, 22d, respectively.

The pulses from the pickups 22a, 22b on the front wheels 11, 12 are fed to a bidirectional counter 26a while the pulses from the switches 22c, 22d on the rear wheels 13, 14 are fed to a bidirectional counter 26b. Bidirectional counters are well known to those skilled in the art and are adapted to add a count of one to the number in the counter when a pulse is applied to an add terminal 27 for the counter and to subtract a count of one when a pulse is applied to a subtract terminal 28. Such counters may also be preset to a certain count by applying a presetting voltage to a terminal 29 of the counter. Bidirectional counters are conventionally made up of a plurality of binary stages and each stage can be preset to either a one or a zero condition by applying a voltage to a particular terminal of the stage. The preset terminal 29 is connected to a terminal of each stage to set the stage to a one or zero condition depending upon the number which is to be preset into the counter.

Output signals from bidirectional counters may also be derived when a predetermined number is registered in the counter. When a predetermined number exists in the counter, each stage has either a one or zero condition depending upon the number and an output voltage is derived from each stage to indicate that the stage is in the condition required for the number. These voltages are applied through an AND gate to an output connection so that an output appears only when all stages are in the conditions necessary for the corresponding number. In the illustrated embodiment, the counter 26a has its stages connected to the inputs of an AND gate 31a while the bidirectional counter 26b has its stages connected to the inputs of an AND gate 31b. Consequently, when the predetermined count exists in the bidirectional counter 26a or 26b where output voltages appear on all inputs to one of the AND gates 31a, 31b, the corresponding gate will be operated to indicate this condition.

In the illustrated embodiment, the AND gates 31a, 31b may be set to operate when the count in the bidirectional counter is zero. In such a condition, all the binary stages of the bidirectional counter will be in their zero state and this will be indicated by voltages on the leads to the respective AND gates. If the counter is to indicate an underinflated tire when the count therein is zero, the counter is preferably initially preset to a central number about midway between zero and the maximum count of the counter. If the counter is a three-stage binary counter, the maximum count is seven and the counter is preferably preset to the number four. The counter will then require three counts on the add terminal to fill to its capacity of seven and one additional count to overflow and return the counter to its zero condition. The bidirectional counter can also be returned to its zero condition by applying four counts to the subtract terminal.

During operation, the preset number will exist in the counter as long as the number of pulses applied to the add and subtract terminals of the bidirectional counters are equal. This will be true as long as the pair of wheels supplying pulses to the counter are rotating at the same angular velocity.

If a tire T becomes underinflated, the diameter of the wheel decreases and the wheel will rotate at a greater angular velocity since it still must move at the same surface speed as the other wheels of the vehicle. If the tire T on the rear wheel 14 becomes underinflated, the pulses which are applied to the subtract terminal 28 of counter 26b will be greater in number than the pulses applied to the add terminal 27 and when the number of revolutions of the wheel 14 exceed the revolutions of the wheel 13 by four, in the illustrated embodiment, the count in the counter will cause operation of the AND gate 31b to provide an output signal indicating an underinflated tire. Similarly, if the tire T on the wheel 13 becomes underinflated while the tire 14 remains normal, the add pulses will exceed the subtract pulses and the count in the counter will increase until the counter fills and returns to zero to operate the AND gate 31b.

While in the given example the underinflated signal is given when the number in the counter is zero, such a signal could be derived for a first number in excess of the preset number and for a different number less than the preset number by providing two output AND gates for each counter. In such a system, the counter would not have to fill to capacity and one AND gate would operate at the lower number and the other AND gate operate at the higher number. It will be understood that the excess number of counts required before the underinflated signal is given may be chosen to accommodate many variable factors, such as wheel size, etc.

The outputs from the AND gates 31a, 31b and any other AND gates which might be provided for indicating that the desired count in the counter has been reached are applied through an OR gate 35 to the gate electrode of a silicon controlled rectifier 37 to fire the rectifier and provide current through a signaling device 39, a lamp in the illustrated embodiment, to indicate to the driver of the vehicle that the tire is underinflated. When the light 39 is once lighted, it is extinguished by operating a reset switch R to break the anode-cathode circuit of the SCR 37. Operation of the switch R also applies a reset voltage to trigger the multivibrator 41 to effect a resetting of the counters.

During normal operations, bidirectional counters 26a, 26b will operate to register in the counters the total difference in wheel revolutions for the wheels connected to the counters. When the car has traveled large distances, the difference in count produced by normal differences in wheel revolutions might cause the counters to falsely indicate an underinflated tire. Similarly, when the velocity of a wheel on one side of the vehicle is being compared with the angular velocity of the wheel on the opposite side, as in the described embodiment, cornering will produce a difference in angular velocity of the wheels which will be reflected in the count in the bidirectional counters. It is desirable that these factors do not cause a false indication of an underinflated tire. Accordingly, the preferred embodiment includes means for periodically resetting the counters to predetermined central counts indicating no difference in angular movements of the wheels so that the counts necessary to obtain an underinflation signal must be obtained within a predetermined time or distance interval.

In the illustrated embodiment, the bidirectional counters 26a, 26b are reset to their central count as a function of distance. To this end a counter 40 has its input connected to the output of the pickup for one of the wheels of the vehicle, the pickup 22a for the wheel 11 in the illustrated embodiment, to count the revolutions of the wheel. Each time the counter 40 fills to capacity, an output signal is applied to a one-shot multivibrator 41 which when triggered applies a presetting potential to the preset terminals 29 of the bidirectional counters 26a, 26b to reset the counters to their central number. The multivibrator 41 also preferably controls respective gates 43 for applying the pulses to the respective add and subtract terminals of the counters 26a, 26b. A gate conditioning voltage is normally applied to inputs 43a of the gates 43 by the multivibrator 41 but this is lost when the multivibrator is triggered from its stable state by the counter 40. The gates 43 may also have a third conditioning input 43c which is lost when it is undesirable to apply pulses to the counters, 26a, 26b, for example, the third conditioning input might be lost when the steering wheel is turned from a straight-ahead position to turn the wheels of the automobile which necessarily results in a difference in angular velocity of the wheels on the opposite sides of the automobile or the input might be lost in response to braking to preclude a false comparison of wheel velocity due to the locking of only some of the wheels of the vehicle during braking.

While the counters 26a, 26b are preferably reset in accordance with the distance traveled by the vehicle, it will be understood that they might be periodically reset on a time basis although such a mode of operation would not take into account the speed of the automobile and distance traveled.

It will be understood that the angular movements of the front and rear wheels on one side of the vehicle or diagonally related wheels may be compared to sense an underinflated tire. If the angular movements of the wheels on the same side of the vehicle are compared the effects of cornering on wheel velocity are minimized.

While a particular system has been utilized to compare the angular movement of one wheel with another wheel, it will be appreciated that the basic concept of the present invention contemplates the use of other sensing systems. For example, a tachometer may be driven by each wheel and the output voltages of the tachometer compared and a control function performed when the outputs differ in a predetermined manner. In such a system, a time delay would be introduced into the circuit for actuating the underinflated indicator to overlook differences in velocity when cornering, etc. As an illustration of such a system, the tachometer outputs may be applied to a wheatstone bridge and a relay which picks up with a time delay connected across the output terminals of the bridge so that when the relay is actuated in response to a difference voltage, it will, after a suitable time delay, if the actuating voltage is not removed, energize an indicator for indicating an underinflated tire. If the difference in the voltages are due to cornering, the voltages will be restored before the relay picks up.

Figure 4:
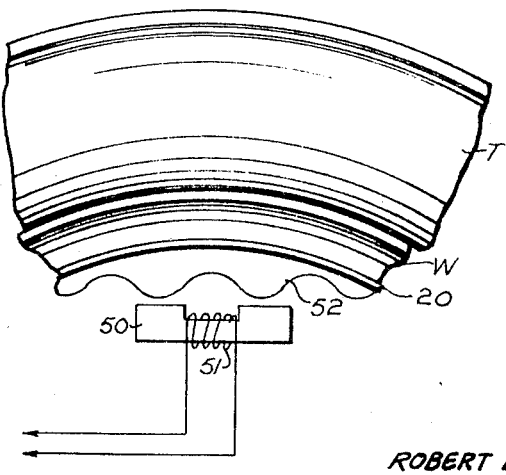
FIG. 4 is a fragmentary view illustrating another type of electromagnetic pickup for sensing wheel movement.

The angular velocity of a wheel may also be sensed by an electromagnet device whose reluctance is changed on rotation of the wheel. Referring to FIG. 4, a U-shaped core 50 having a coil 51 thereon has its ends positioned adjacent the inner periphery of a member 52 carried by the inner periphery of the brake drum. The inner side of member 52 is sinuous in configuration so that the reluctance of the coil is varied as the member rotates past the coil to provide a signal which is modulated at a frequency which is a function of speed. This frequency may be compared in a frequency comparator with a corresponding frequency from another wheel comparator to sense a difference in the angular velocities of the wheels and to provide an underinflated signal as in the case of the tachometers described above.

While a preferred embodiment has been described in detail, it is to be understood that further modifications and constructions will occur to those skilled in the art. For example, a reference signal may be derived from a rotating part other than another wheel and the signal from a wheel compared with the reference. It is hereby my intention to cover all such constructions and modifications which fall within the ability of those skilled in the art and the scope and spirit of the appended claims.

We claim:

1. In a vehicle, a system for sensing an underinflated tire on a first wheel thereof comprising first means responsive to the rotation of the wheel to provide an output which is a function of the angular movement of the wheel, means for providing a reference which varies with vehicle speed, second means for comparing said output with said reference to provide a signal when said output and reference compare in a predetermined manner and means responsive to said second means for indicating to an occupant of the vehicle the presence of an underinflated tire.

2. In a vehicle, the system as defined in claim 1 wherein said means for providing a reference includes rotation sensing means having a signal output which is a function of the angular movement of another part of said vehicle whose rotation is a function of vehicle speed with said signal output constituting said reference.

3. In a vehicle, the system as defined in claim 2 wherein said part is another wheel of said vehicle.

4. In a vehicle, the system as defined in claim 1 wherein said first means comprises pulse generating means for generating first pulses as a function of the rotation of said second means comprises means for counting said pulses and reference pulses constituting said reference and providing said signal when the total of the first pulses differ by a predetermined number from the total of the reference pulses.

5. In a vehicle having a plurality of wheels, first means dependent upon the angular movement of a wheel to indicate an underinflated tire thereon, and means for preventing false signals of tire underinflation while a predetermined vehicle operation condition prevails comprising control means including means for sensing said condition and means connected to the last-said means and said first means for rendering said first means ineffective while said condition prevails.

6. In a vehicle, a system for sensing an underinflated tire on a first wheel thereof comprising first means responsive to the rotation of the wheel to provide an output which is a function of the angular movement of the wheel, and second means for comparing said output with a reference which varies with vehicle speed to provide a signal when said output and reference differ in a predetermined manner, said first means comprising pulse generating means for generating first pulses as a function of the rotation of said wheel and said second means comprising means for counting said pulses and reference pulses constituting said reference and providing said signal when the total of the first pulses differ by a predetermined number from the total of the reference pulses, and wherein said means for counting is a bidirectional counter having add and subtract terminals, said first and reference pulses being applied to a respective one of said terminals.

7. In a vehicle having a plurality of wheels, a system for sensing an underinflated tire on a wheel thereof comprising first means responsive to the rotation of a first wheel of the vehicle to provide a first output which is a function of the angular movement of the first wheel, second means responsive to the rotation of a second wheel of the vehicle to provide a second output which is a function of the angular movement of the second wheel, third means responsive to the rotation of a third wheel of the vehicle to provide a third output which is a function of the angular movement of the third wheel, fourth means responsive to the rotation of a fourth wheel of the vehicle to provide a fourth output which is a function of the angular movement of the fourth wheel, comparing means for comparing at least a pair of said outputs to determine if one of said pair of outputs results from the presence of an underinflated tire on one of the wheels with which said pair of outputs is associated, and means responsive to said comparing means for comparing said pair of outputs for indicating to an occupant of the vehicle the presence of an underinflated tire on the vehicle when one of said pair of outputs results from the presence of an underinflated tire.

8. A system for sensing an underinflated tire on a first wheel thereof comprising first means responsive to the rotation of the wheel to provide an output which is a function of the angular movement of the wheel, second means for comparing said output with a reference which varies with vehicle speed to provide a signal when said output and said reference differ in a predetermined manner, said first means comprising pulse generating means for generating first pulses as a function of the rotation of said wheel and said second means comprising means for counting said pulses and reference pulses constituting said reference and providing said signal when the total of the first pulses differ by a predetermined number from the total of the reference pulses and resetting means for periodically resetting said means for counting to a condition indicating no difference in count of said first pulses and said reference pulses.

9. In a vehicle, a system as defined in claim 8 wherein said resetting means comprises means responsive to a condition indicative of wheel revolutions of said vehicle for periodically resetting said means for counting.

10. In a vehicle, a system as defined in claim 9 wherein said resetting means comprises a counter for counting revolution pulses from a wheel of said vehicle.

11. In a vehicle, a system as defined in claim 8 wherein said means for counting is a bidirectional counter having add and subtract terminals with said first pulses and said reference pulses each being applied to a respective one of said terminals and said resetting means comprises means for setting said counter to a predetermined number.

12. In a vehicle, a system as defined in claim 8 wherein said resetting means comprises a second counter for counting pulses from a part of the vehicle which rotates as a function of vehicle speed and means responsive to said second counter for periodically resetting said bidirectional counter to a predetermined count.

13. In a vehicle, the system as defined in claim 2 wherein said first means comprises a pulse generator for generating first pulses whose number indicates revolutions of the wheel, and said means for providing a reference comprises a pulse generator responsive to rotation of said part for generating second pulses indicative of the revolutions of said part, said first and second pulses being related in a one-to-one relationship when the vehicle does not have an underinflated tire thereon, and a counter for counting said first and second pulses respectively, and providing a signal when the number of pulses counted from said part and said wheel compare in a predetermined manner.

14. In a vehicle, the system as defined in claim 13 wherein said counter is a bidirectional counter having add and subtract terminals, said first and second pulses being applied to respective ones of said terminals.

15. A method of detecting an underinflated tire on a wheel of a vehicle comprising the steps of comparing the angular velocity of said wheel with the angular velocity of a part normally driven as a function of vehicle speed, determining the presence of an underinflated tire on said wheel when the angular velocity of the part and said wheel compare in a predetermined manner and signaling an occupant of the vehicle upon determining the presence of an underinflated tire on the wheel.

16. A method of comparing the diameters of two rotating objects which comprises the steps of driving the objects whose diameters are to be compared at the same surface speed and measuring and comparing the angular velocities thereof.

17. The method of determining the existence of an underinflated tire on a vehicle which comprises sensing and comparing the angular movements of a plurality of wheels of the vehicle while the vehicle is moving and indicating the presence of an underinflated tire on one of said plurality of wheels when the angular movements compare in a predetermined manner.

18. In a vehicle having wheels with inflated tires thereon, first means for measuring and comparing the angular movement of two of said wheels and second means for indicating the presence of an underinflated tire on one of said wheels, said second means being responsive to said first means for providing an underinflated signal to an occupant of the vehicle when the angular movements of said wheels compare in a predetermined manner.

UNITED STATES PATENT OFFICE
CERTIFICATE OF CORRECTION

Patent No. 3,581,277           Dated May 25, 1971

Inventor(s) Robert D. Beatty, Jr. and Thomas C. Griffiths

It is certified that error appears in the above-identified patent and that said Letters Patent are hereby corrected as shown below:

Column 4, line 73, after "said" insert -- wheel and said --.

Signed and sealed this 7th day of December 1971.

(SEAL)
Attest:

EDWARD M. FLETCHER, JR.       ROBERT GOTTSCHALK
Attesting Officer              Acting Commissioner of Patents